United States Patent
Kubota et al.

(10) Patent No.: US 11,577,787 B2
(45) Date of Patent: Feb. 14, 2023

(54) REAR VEHICLE-BODY STRUCTURE OF VEHICLE

(71) Applicant: MAZDA MOTOR CORPORATION, Hiroshima (JP)

(72) Inventors: Harumitsu Kubota, Aki-gun (JP); Taichi Hirakawa, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 109 days.

(21) Appl. No.: 17/179,292

(22) Filed: Feb. 18, 2021

(65) Prior Publication Data

US 2021/0300477 A1   Sep. 30, 2021

(30) Foreign Application Priority Data

Mar. 31, 2020   (JP) .............................. JP2020-061807

(51) Int. Cl.
| | | |
|---|---|---|
| *B60J 7/00* | (2006.01) | |
| *B62D 25/08* | (2006.01) | |
| *B62D 21/15* | (2006.01) | |
| *B62D 25/02* | (2006.01) | |

(52) U.S. Cl.
CPC .......... *B62D 25/087* (2013.01); *B62D 21/152* (2013.01); *B62D 25/02* (2013.01)

(58) Field of Classification Search
CPC .... B62D 25/087; B62D 21/152; B62D 25/02; B62D 25/08
See application file for complete search history.

(56) References Cited

U.S. PATENT DOCUMENTS

| | | | |
|---|---|---|---|
| 2016/0159400 A1 | 6/2016 | Matsuoka et al. | |
| 2016/0251035 A1* | 9/2016 | Kodama | B62D 21/152 |
| | | | 296/187.12 |
| 2016/0362139 A1* | 12/2016 | Sekiguchi | B62D 25/082 |
| 2018/0065670 A1* | 3/2018 | Yamada | B62D 25/2027 |
| 2018/0065671 A1* | 3/2018 | Yoshimura | B60R 19/34 |
| 2021/0300477 A1* | 9/2021 | Kubota | B62D 25/08 |

FOREIGN PATENT DOCUMENTS

JP        2016107779 A     6/2016

* cited by examiner

*Primary Examiner* — Kiran B Patel
(74) *Attorney, Agent, or Firm* — Studebaker & Brackett PC

(57) ABSTRACT

A rear vehicle-body structure is provided that can absorb a rear-end collision load by a short frame region on a vehicle-body rear side. Embodiments include a rear side frame having a rear-side breaking frame section including a rear-side breakage starting portion on a rear side among breakage starting portions disposed at intervals in a front-rear direction, a front-side breaking frame section including a front-side breakage starting portion on a front side and at which the direction of breakage is opposite from the direction of breakage at the rear-side breakage starting portion, and a middle frame section between the rear-side breakage starting portion and the front-side breakage starting portion. The axial proof stress of the rear-side breaking frame section is lower than the axial proof stress of the front-side breaking frame section; and the middle frame section includes beads at a predetermined interval in an axial direction.

20 Claims, 7 Drawing Sheets

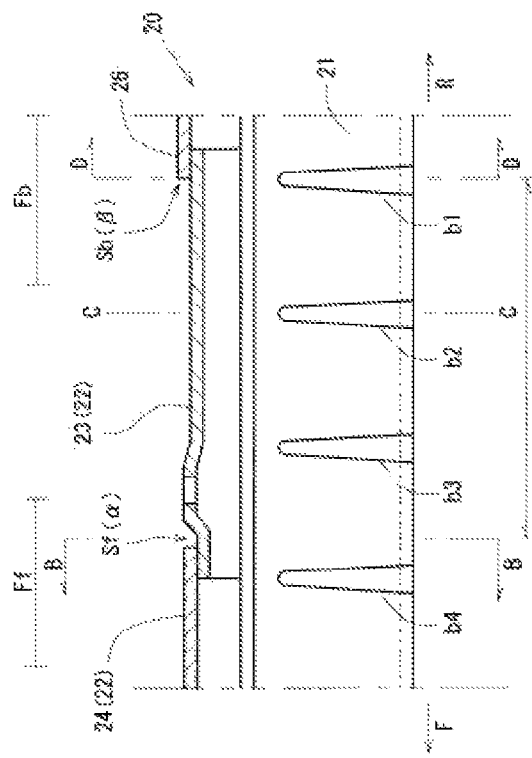
Fig. 5A
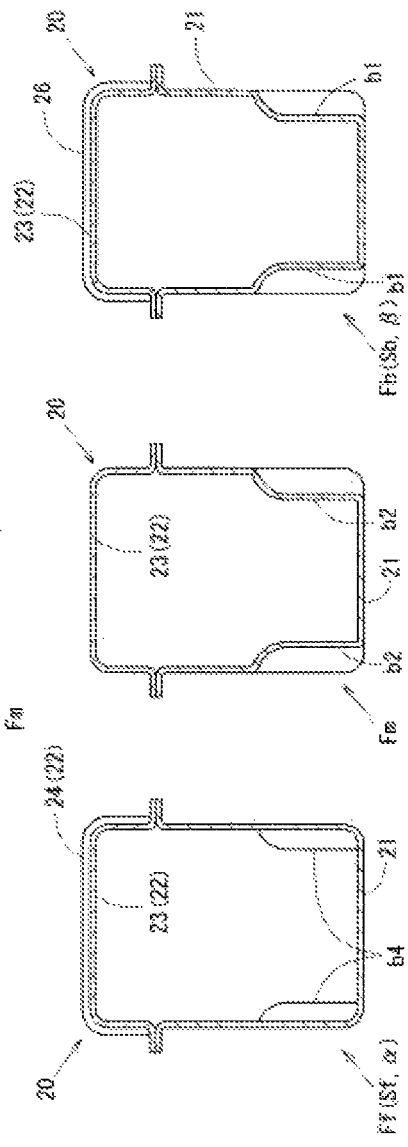
Fig. 5B
Fig. 5C
Fig. 5D

REAR VEHICLE-BODY STRUCTURE OF VEHICLE

TECHNICAL FIELD

The present disclosure relates to a rear vehicle-body structure of a vehicle, more particularly to a rear vehicle-body structure of a vehicle in which a rear side frame extending toward a vehicle rear side is disposed on each side in a vehicle width direction.

BACKGROUND ART

Typically, for example, EVs (electric vehicles that drive wheels by a motor supplied with electricity from a battery unit) have a battery unit disposed under a front floor panel and a kick-up, while range-extended electric vehicles (so-called REEVs that include a wheel driving motor, a battery unit that supplies the motor with electricity, and an engine that drives a generator, and supply electricity generated by the generator to a battery to charge the battery) have a fuel tank disposed further rearward of the battery unit.

Japanese Patent Laid-Open No. 2016-107779 discloses a rear vehicle-body structure in which a rear part of each rear side frame deforms under a rear-end collision load so as to bend compactly from a rear side and thereby absorbs the load, while a middle part of the rear side frame bends significantly toward a vehicle-width-direction inner side around a pivot point set on a front side thereof, so that a rear floor panel deforms and thereby absorbs the load.

However, there is room for improvement in terms of absorption of a rear-end collision load in order to secure a space for the passenger compartment, and particularly to protect a battery unit/fuel tank disposed under a kick-up in an EV or an REEV, in the event of a rear-end collision.

SUMMARY

Therefore, the present disclosure provides a rear vehicle-body structure of a vehicle that can absorb a rear-end collision load by a short frame region on a vehicle-body rear side.

In a rear vehicle-body structure of a vehicle of the present disclosure, a rear side frame extending toward a vehicle rear side is disposed on each side in a vehicle width direction. Breakage starting portions of breakage in a substantially up-down direction are formed at predetermined intervals in a front-rear direction at a vehicle rear-side part of the rear side frame. In the rear side frame, a frame region including a first breakage starting portion that is located on a rear side among the breakage starting portions disposed at predetermined intervals in the front-rear direction is defined as a first frame section, and a frame region including a second breakage starting portion which is disposed on a front side and at which the direction of breakage is opposite from the direction of breakage at the first breakage starting portion is defined as a second frame section. A frame region between the first breakage starting portion and the second breakage starting portion is defined as a middle frame section. An axial proof stress that is a proof stress in a direction along an axial direction in the first frame section is set to be lower than an axial proof stress along an axial direction in the second frame section. The middle frame section is provided with a plurality of low-axial-proof-stress portions at predetermined intervals in an axial direction.

According to this configuration, when a rear-end collision load is input, breakage toward one side in the up-down direction at the first breakage starting portion located on the rear side in the rear side frame, breakage toward the other side at the second breakage starting portion located on the front side, and axial compression in the middle frame section of the rear side frame occur in this order. If axial compression in the middle frame section occurs before breakage at the first breakage starting portion and the second breakage starting portion, the rear-end collision load can be absorbed but is absorbed by a larger frame region.

Specifically, the rear-end collision load can be absorbed by a short frame region on the vehicle-body rear side when the middle frame section undergoes axial compression after breakage in the first frame section due to the first breakage starting portion and breakage in the second frame section due to the second breakage starting portion occur. Thus, in the event of a rear-end collision, a space for the passenger compartment can be secured and a battery unit/fuel tank disposed under a kick-up in an EV or an REEV can be protected.

In one aspect of implementation of the present disclosure, the axial proof stress in the rear side frame is set so as to decrease in order of the low-axial-proof-stress portion, the second breakage starting portion, and the first breakage starting portion. According to this configuration, when a rear-end collision load is input, breakage at the first breakage starting portion, breakage at the second breakage starting portion, and axial compression in the middle frame section occur reliably in this order, so that the rear-end collision load can be reliably absorbed by a short frame region on the vehicle-body rear side.

In another aspect of implementation of the present disclosure, the first frame section breaks so as to bend outward from the first breakage starting portion as a starting point, and the second frame section breaks so as to bend inward from the second breakage starting portion as a starting point. According to this configuration, effectiveness of load absorption (energy absorption) in a short frame region on the vehicle-body rear side can be enhanced.

In a further aspect of implementation of the present disclosure, the breakage starting portion is formed by a fragile portion that is formed in at least one of an upper surface and a lower surface of the rear side frame. According to this configuration, the rear side frame breaks reliably in the up-down direction under a rear-end collision load at the breakage starting portion that is formed by the fragile portion having lower rigidity than other portions of the rear side frame.

The fragile portion may be formed by a bead to be described later that reduces a dimension in a width direction, a welded area where the same members are joined and welded together, a difference in rigidity occurring at a border portion where members different in rigidity from each other are connected to each other, or a combination of these features.

In one aspect of implementation of the present disclosure, a bracket to which a setting plate is coupled is provided on the upper side of a rear end of the rear side frame, and the bracket has higher rigidity than the rear side frame. The fragile portion at the first breakage starting portion is formed by a bead that is formed so as to reduce the width of a cross-section of the rear side frame on a lower surface side, and a border on an upper surface side between a rear end portion of the rear side frame and a front end of the bracket.

According to this configuration, a difference in rigidity between the rear side frame and the bracket occurs on the upper surface side at the border between the rear end portion of the rear side frame and the front end of the bracket. Since the bead is formed so as to reduce the width of the cross-section on the lower surface side, the rigidity at the cross-section is reduced. Thus, the fragile portion can be formed by the bead formed on the lower surface side of the first breakage starting portion and the border on the upper surface side between the rear side frame and the bracket, and the first breakage starting portion at which the first frame section breaks in the up-down direction can be reliably formed.

The direction of breakage of the first frame section from the first breakage starting portion as a starting point can be easily set by adjusting the difference in rigidity between the rear side frame and the bracket and the width of the cross-section of the first frame section that is reduced by the bead.

In another aspect of implementation of the present disclosure, the rear side frame includes a U-shaped member that has a U-shape in cross-section and an upper wall member that closes an upper part of the U-shaped member. The upper wall member is formed by a rear-side upper wall member that is disposed on the rear side in the rear side frame and a front-side upper wall member that is disposed on the front side. The rear-side upper wall member is set to have a lower proof stress than the front-side upper wall member. The fragile portion at the second breakage starting portion is formed by a border between the rear-side upper wall member and the front-side upper wall member.

According to this configuration, a difference in rigidity between the rear-side upper wall member and the front-side upper wall member occurs on the upper surface side at the border between the rear-side upper wall member and the front-side upper wall member. Thus, the fragile portion can be formed by the border between the rear-side upper wall member and the front-side upper wall member on the upper surface side of the second breakage starting portion, and the second breakage starting portion at which the second frame section breaks in the up-down direction can be reliably formed.

Since the proof stress of the rear-side upper wall member 23 constituting the middle frame section is set to be lower than the proof stress of the member constituting part of the rear side frame on the front side from the middle frame section, it is possible to reliably absorb the load (energy) in a rear-end collision by causing the middle frame section to undergo axial compression.

In a further aspect of implementation of the present disclosure, the low-axial-proof-stress portion is formed by a bead that is formed so as to reduce the width of the cross-section of the rear side frame. According to this configuration, it is possible to reliably absorb the load (energy) in a rear-end collision by causing the middle frame section to undergo axial compression. A desired proof stress of the middle frame section can be set by adjusting the interval of the beads in the axial direction or the width of the cross-section of the middle frame section that is reduced by the beads. Thus, the proof stress can be set such that axial compression in the middle frame section occurs after breakage at the first breakage starting portion and breakage at the second breakage starting portion.

The present disclosure has an advantageous effect of absorbing a rear-end collision load by a short frame region on a vehicle-body rear side.

BRIEF DESCRIPTION OF THE DRAWINGS

FIG. 5A to FIG. 5D are views illustrating the shape of a rear side frame.

DETAILED DESCRIPTION

Absorption of a rear-end collision load by a short frame region on a vehicle-body rear side is achieved by a configuration in which a rear side frame extending toward a vehicle rear side is disposed on each side in a vehicle width direction. Breakage starting portions of breakage in a substantially up-down direction are formed at predetermined intervals in a front-rear direction at a vehicle rear-side part of the rear side frame. In the rear side frame, a frame region including a first breakage starting portion that is located on a rear side among the breakage starting portions disposed at predetermined intervals in the front-rear direction is defined as a first frame section, and a frame region including a second breakage starting portion which is disposed on a front side and at which the direction of breakage is opposite from the direction of breakage at the first breakage starting portion is defined as a second frame section. A frame region between the first breakage starting portion and the second breakage starting portion is defined as a middle frame section. The axial proof stress of the first frame section is set to be lower than the axial proof stress of the second frame section; and the middle frame section is provided with a plurality of low-axial-proof-stress portions at predetermined intervals in an axial direction.

Figure 1:
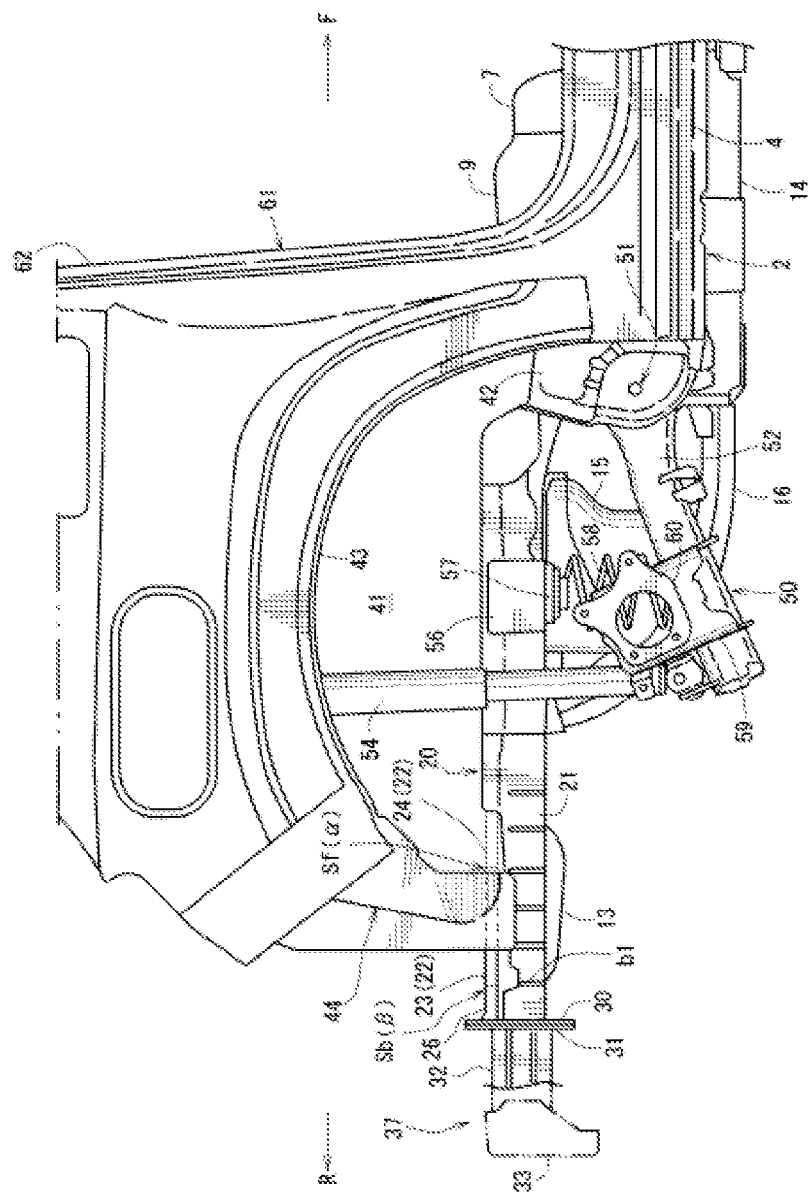
FIG. 1 is a side view of a vehicle right side showing a rear vehicle-body structure of a vehicle of the present disclosure.
Figure 2:
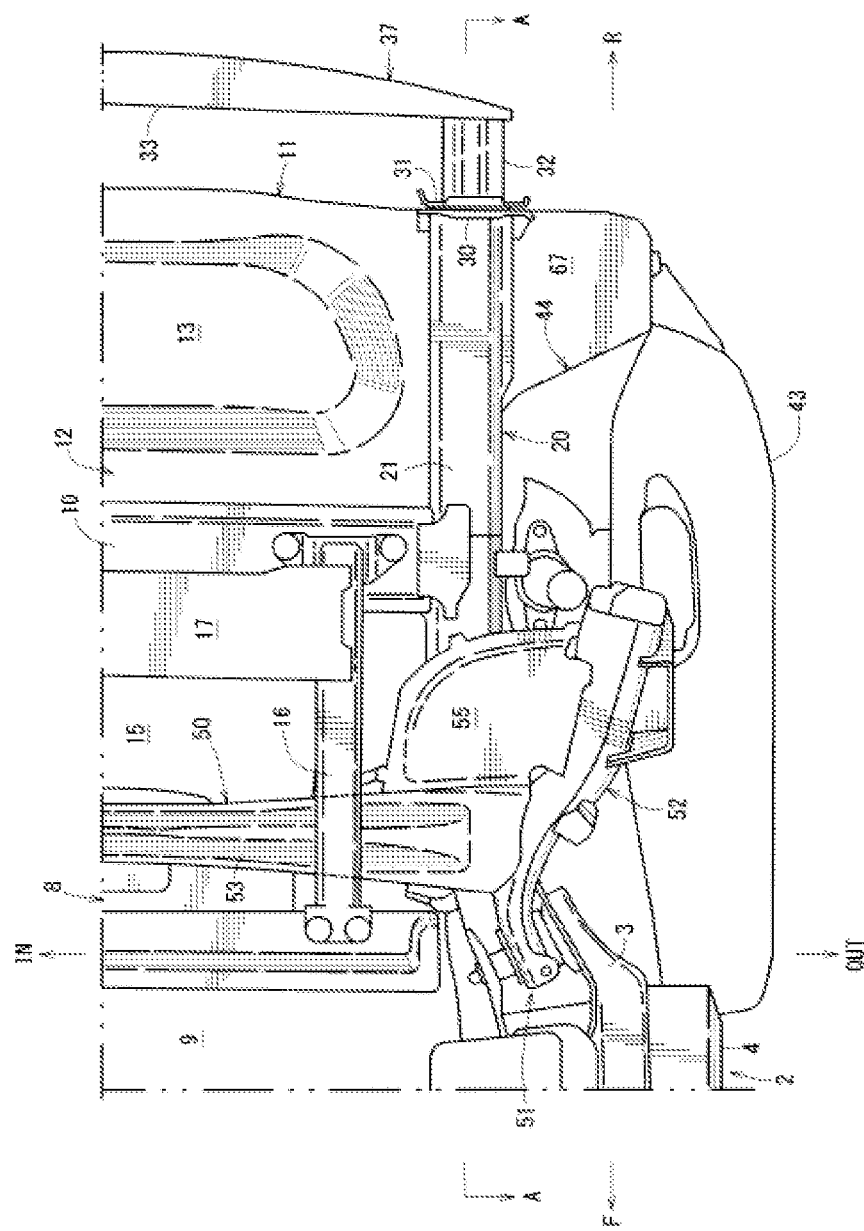
FIG. 2 is a bottom view of the vehicle right side of FIG. 1.
Figure 3:
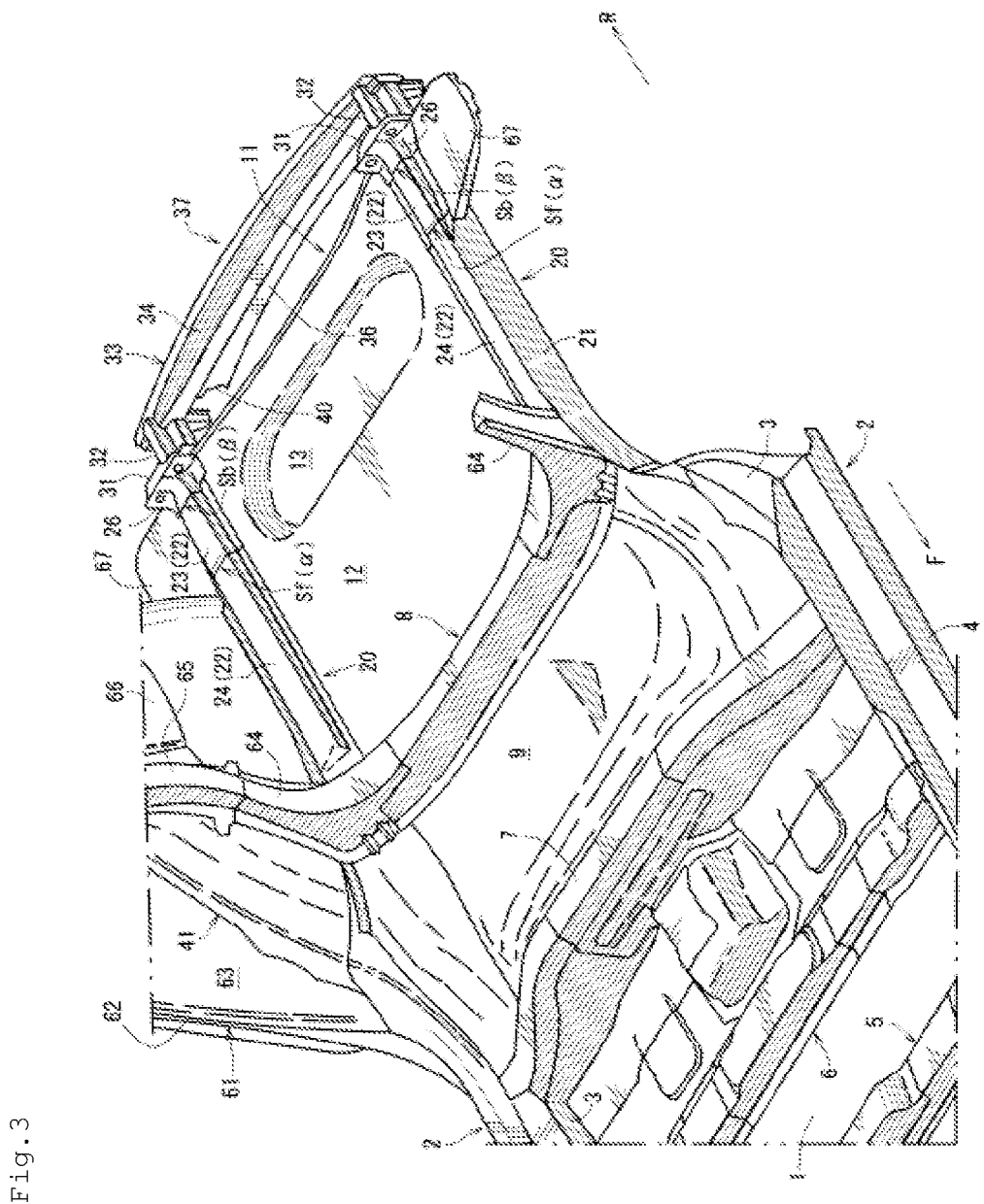
FIG. 3 is a perspective view showing the rear vehicle-body structure of the vehicle.
Figure 4:
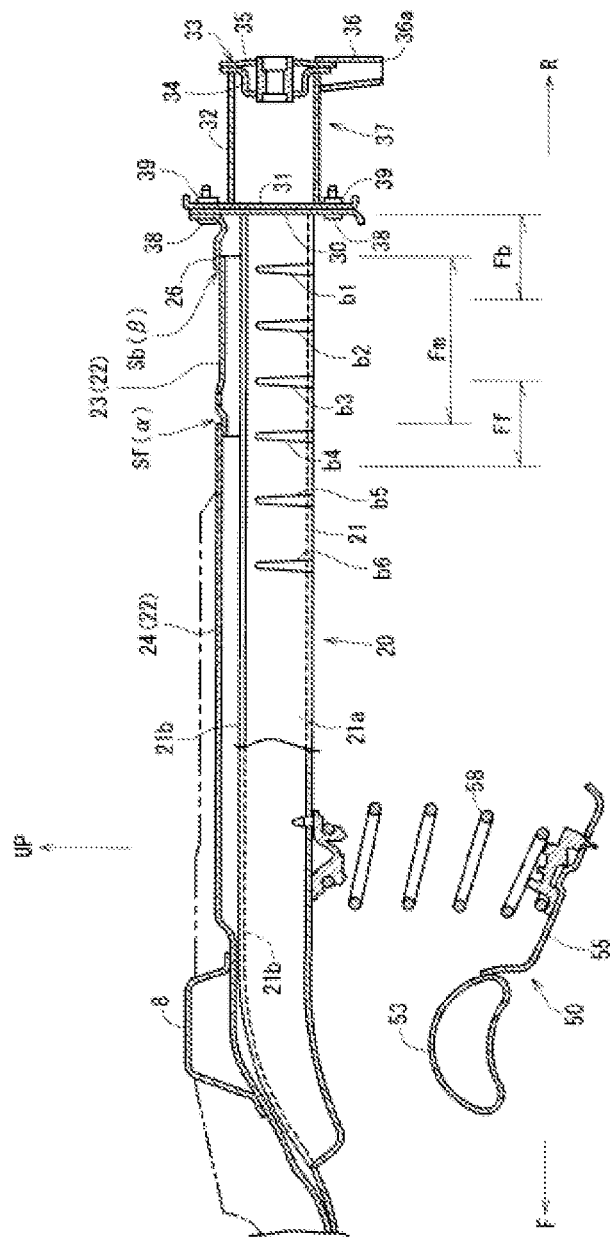
FIG. 4 is a sectional view taken along line A-A of FIG. 2.
Figure 6:
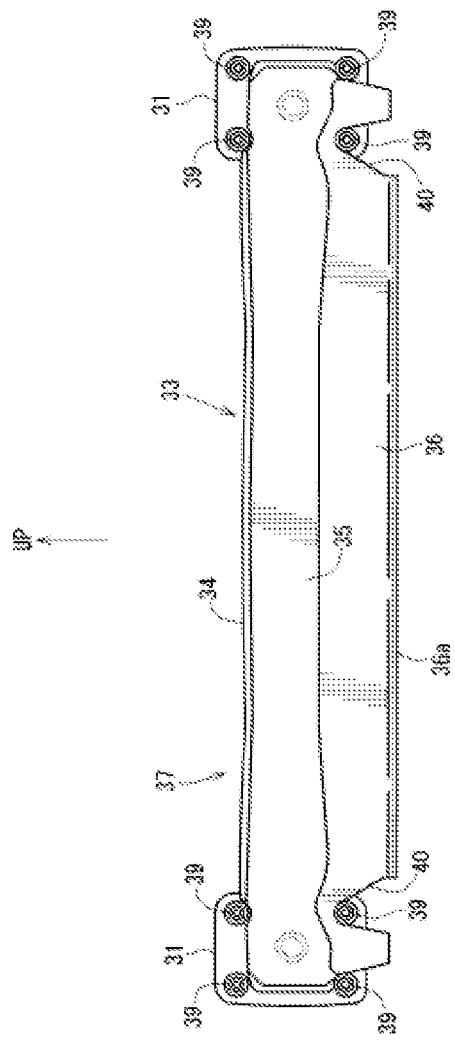
FIG. 6 is a rear view of a rear bumper reinforcement.

One embodiment of the present disclosure will be described in detail below based on the drawings. The drawings show a rear vehicle-body structure of a vehicle. FIG. 1 is a side view of a vehicle right side showing the rear vehicle-body structure of the vehicle. FIG. 2 is a bottom view of the vehicle right side of FIG. 1. FIG. 3 is a perspective view showing the rear vehicle-body structure of the vehicle. FIG. 4 is a sectional view taken along line A-A of FIG. 2. FIG. 5A is an enlarged view of a main part of FIG. 4. FIG. 5B is a sectional view taken along line B-B of FIG. 5A. FIG. 5C is a sectional view taken along line C-C of FIG. 5A. FIG. 5D is a sectional view taken along line D-D of FIG. 5A. FIG. 6 is a rear view of a rear bumper reinforcement.

In FIG. 3, a front floor panel 1 forming a floor of a vehicle interior is provided, and side sills 2 as vehicle body strengthening members extending in a vehicle front-rear direction are provided at left and right side portions in a vehicle width direction of the front floor panel 1. As shown in FIG. 2 and FIG. 3, each side sill 2 includes a side sill inner portion 3, a side sill reinforcement 4, and a side sill outer portion included in an outer panel of a vehicle body, and has a side sill closed cross-section extending in the vehicle front-rear direction.

As shown in FIG. 3, a front cross-member 5 (so-called No. 2 cross-member) extending in the vehicle width direction and coupling together the pair of left and right side sills 2, 2 is provided on an upper surface of the front floor panel 1 between the left and right side sills 2, 2, and a closed cross-section extending in the vehicle width direction is formed between the front cross-member 5 and the front floor panel 1.

As shown in FIG. 3, a middle cross-member 6 (so-called No. 2.5 cross-member) extending in the vehicle width direction and coupling together the left and right side sills 2, 2 is provided rearward of the front cross-member 5 so as to be parallel to the front cross-member 5. A closed cross-section extending in the vehicle width direction is formed between the middle cross-member 6 and the upper surface of the front floor panel 1.

As shown in FIG. 3, a kick-up 7 rising upward and then extending rearward is provided at a rear end portion of the front floor panel 1. A rear seat pan 9 above which a rear seat is installed is provided between the kick-up 7 shown in FIG. 1 and FIG. 3 and a rear cross-member 8 (so-called No. 4 cross-member) shown in FIG. 2 and FIG. 3. As shown in FIG. 2, a rear end cross-member 10 (so-called No. 4.5 cross-member) that extends in the vehicle width direction and couples together a pair of left and right rear side frames 20, 20 to be described later is provided further rearward of the rear cross-member 8.

The rear end cross-member 10 is provided parallel to the rear cross-member 8. A rear floor 12 is formed from the rear cross-member 8 to a rear end portion 11, and a trunk recess 13 protruding toward a vehicle lower side is formed at the center in the vehicle width direction of a rear portion of the rear floor 12. The vehicle in this embodiment is an electric vehicle. As shown in FIG. 1, a battery unit 14 that supplies electricity to a vehicle propulsion driving motor is disposed under the front floor panel 1 and the rear seat pan 9 located rearward of the kick-up 7.

As shown in FIG. 2, a fuel tank 15 is disposed under the rear floor 12, between the rear cross-member 8 (so-called No. 4 cross-member) and the rear end cross-member 10 (so-called No. 4.5 cross-member), and the fuel tank 15 is protected by a tank guard 16 extending in the vehicle front-rear direction and a tank guard 17 extending in the vehicle width direction, both serving as protectors.

As shown in FIG. 1, FIG. 2, and FIG. 3, the rear side frames 20 extending in the vehicle front-rear direction are joined and fixed to left and right side portions of the rear floor 12. As shown in FIG. 2 and FIG. 3, the rear side frames 20 are provided so as to extend from the rear end portion 11 toward a vehicle front side up to positions at which the rear side frames 20 overlap rear portions of the side sills 2. The rear cross-member 8 and the rear end cross-member 10 are provided across the pair of left and right rear side frames 20, 20.

As shown in FIG. 1, FIG. 2, and FIG. 4, a crash can 32 as a load absorbing part is mounted at a rear end of each rear side frame 20 through a setting plate 30 and a mounting plate 31, and a rear bumper beam 33 extending in the vehicle width direction is laterally suspended between the pair of left and right crash cans 32, 32.

As shown in FIG. 4 and FIG. 6, the rear bumper beam 33 includes a bumper beam main body 34 having a shape of a hat lying on its side in cross-section, a closing plate 35 that closes a rear open side of the bumper beam main body 34, and a lower extension portion 36 that is joined and fixed to the closing plate 35 and extends downward along the entire width of the closing plate 35 in the vehicle width direction.

The rear bumper beam 33 extends in the vehicle width direction along a rear bumper (not shown), and the rear bumper beam 33 and the crash cans 32, 32 as load absorbing parts extending from left and right ends of the rear bumper beam 33 toward the vehicle front side constitute a rear bumper reinforcement 37.

Here, the rear side frames 20 extend in the vehicle front-rear direction respectively along left and right side portions of the rear floor 12 and are coupled at rear ends to front ends of the crash cans 32, 32. As shown in FIG. 4, the setting plate 30 and the mounting plate 31 are fastened and fixed to each other with bolts 38 and nuts 39 at a total of four positions.

As shown in FIG. 4 and FIG. 6, a lower end 36a of the lower extension portion 36 extends to below the positions of the bolts 38 and the nuts 39 located on the vehicle-width-direction inner side and the lower side that are mounting positions of the crash cans 32. As shown in FIG. 6, cutouts 40 that are open at a lower side are formed in the lower extension portion 36, at positions at which the lower extension portion 36 overlaps the mounting positions of the crash cans 32 as load absorbing parts (the positions of the bolts 38 and the nuts 39 located on the vehicle-width-direction inner side and the lower side) as seen from the vehicle rear side. The cutouts 40 are formed so that the rear bumper reinforcement 37, particularly the crash cans 32, are easy to mount.

As shown in FIG. 1, FIG. 2, and FIG. 3, a rear wheel well 44 composed of a rear wheel well inner upper portion 41, a rear wheel well inner lower portion 42, and a rear wheel well outer portion 43 is provided on the vehicle-width-direction outer side of the rear side frame 20.

As shown in FIG. 1, FIG. 2, and FIG. 4, this vehicle includes a torsion-beam rear suspension 50 as a rear wheel suspension. As shown in FIG. 1, FIG. 2, and FIG. 4, the torsion-beam rear suspension 50 includes: trailing arms 52 having a hollow internal structure each extending from a front-end shaft support portion 51 toward a rear lower side; a torsion beam 53 having a hollow internal structure as a torsion bar spring that extends in the vehicle width direction and couples together the pair of left and right trailing arms 52, 52; a strut damper stay 54 (so-called rear damper) suspended under tension between upper portions of free ends of the trailing arms 52 and a body (see a damper support portion 66 to be described later); lower spring seats 55 each provided at a corner between the trailing arm 52 and the torsion beam 53; upper spring seats 57 each mounted on the rear side frame 20 through a bracket 56; and coil springs 58 as suspension springs each suspended under tension between the upper and lower spring seats 57, 55.

As shown in FIG. 1, a hub member 60 is mounted through a bracket 59 on a vehicle-width-direction outer side of the free end of each trailing arm 52, and the hub member 60 supports a rear wheel. As also shown in FIG. 1, a center pillar-less door opening 62 is formed by the side sill 2 extending in the vehicle front-rear direction at a lower part, a quarter pillar 61 extending in a vehicle up-down direction at a rear part, a roof side rail extending in the vehicle front-rear direction at an upper part, a hinge pillar extending in the vehicle up-down direction at a front part, and a front pillar coupling together a front end of the roof side rail and an upper end of the hinge pillar in an oblique direction. The door opening 62 is configured to dispose therein a front door and a rear door forming a double door.

The following reference signs in FIG. 3 denote the following parts: 63 is side panel inner portions; 64 is lower brace members extending upward along the rear wheel well inner upper portions 41 from left and right side portions of the rear cross-member 8; 65 is upper brace members extending further upward along the rear wheel well inner upper portions 41 from the lower brace members 64; 66 is damper support portions; and 67 is floor side panels formed so as to protrude from rear portions of the rear side frames 20 outward in the vehicle width direction.

As shown in FIG. 4, the rear side frame 20 is composed of a rear side frame main body 21 having an inverted hat-shaped cross-section along the vehicle width direction and including a U-shaped portion that is open at an upper side, and an upper wall member 22 that closes an upper part of the inverted hat-shaped rear side frame main body 21.

As shown in FIG. 5B to FIG. 5D, the rear side frame main body 21 as a U-shaped member has an inverted hat shape formed by a U-shaped portion 21a and a flange 21b extending leftward and rightward in the vehicle width direction from an upper end of the U-shaped portion 21a. The upper wall member 22 has a hat-shaped cross-section of which the dimension in the up-down direction is smaller than that of the rear side frame main body 21. The rear floor 12 shown in FIG. 3 is interposed and fixed between a flange on the vehicle-width-direction inner side of the upper wall member 22 having a hat-shaped cross-section and the flange 21b on the vehicle-width-direction inner side of the rear side frame main body 21 having an inverted hat-shaped cross-section. Thus, the rear side frame main bodies 21 extend in the vehicle front-rear direction on lower sides of the left and right side portions of the rear floor 12, while the upper wall members 22 extend in the vehicle front-rear direction on upper sides of the left and right side portions of the rear floor 12.

The rear side frame main body 21 is shared by a front part and a rear part of the rear side frame 20, while the upper wall member 22 is divided into a rear-side upper wall member 23 having lower proof stress and a front-side upper wall member 24 having higher proof stress.

In this embodiment, the rear side frame main body 21, the rear-side upper wall member 23, and the front-side upper wall member 24 are all formed by high-tensile-strength rigid plates. The plate thickness of the front-side upper wall member 24 is set to be smaller than the plate thickness of the rear side frame main body 21, and the plate thickness of the rear-side upper wall member 23 is set to be even smaller than the plate thickness of the front-side upper wall member 24. High-tensile-strength rigid plates made of materials varying in proof stress are used.

As shown in FIG. 4 and FIG. 5A, since the plate thickness of the rear-side upper wall member 23 is set to be even smaller than the plate thickness of the front-side upper wall member 24, a difference in rigidity between the front-side upper wall member 24 and the rear-side upper wall member 23 occurs at a border portion α between the front-side upper wall member 24 and the rear-side upper wall member 23. Thus, a front-side breakage starting portion Sf that acts as a breakage starter at a stepped portion 25 above the border portion α in a rear-end collision of the vehicle is formed.

As shown in FIG. 1, the border portion α is formed further rearward of the fuel tank 15, at a position corresponding to a middle position in the front-rear direction of the trunk recess 13 of the rear floor 12. As shown in FIG. 4, a plurality of beads b (b1 to b6) depressed into the closed cross-section of the rear side frame are formed as fragile portions relative to a load applied in the front-rear direction, at predetermined intervals in the axial direction on the lower side of the rear side frame main body 21 constituting part of the rear side frame 20. As shown in FIG. 5B to FIG. 5D, these beads are formed by depressing each of inner and outer sides of the U-shaped portion 21a toward an inner side in the width direction. Thus, the rigidity at the cross-sections is reduced compared with portions where no bead b is formed.

FIG. 5A is an enlarged side view of a front-side breaking frame section Ff and a rear-side breaking frame section Fb, both to be described later, of the rear side frame 20. FIG. 5B is a sectional view taken along line B-B of FIG. 5A, i.e., a sectional view of the front-side breakage starting portion Sf constituting part of the front-side breaking frame section Ff. FIG. 5C is a sectional view taken along line C-C of FIG. 5A, i.e., a sectional view of a middle frame section Fm. FIG. 5D is a sectional view taken along line D-D of FIG. 5A, i.e., a sectional view of the rear-side breakage starting portion Sb constituting part of the rear-side breaking frame section Fb.

As shown in FIG. 4 and FIG. 5A, the bead b1 among the beads b thus configured is formed at an axial position corresponding to a border β to be described later, while the bead b4 is formed at a position offset from the border portion α toward a vehicle front side.

As shown in FIG. 3 and FIG. 4, a bracket 26 shaped to straddle an upper surface of the rear-side upper wall member 23 and a front surface of the setting plate 30 is provided on the upper side of the rear end of the rear side frame 20, particularly on the upper side of a rear end of the rear-side upper wall member 23. The border with a front end of the bracket 26 at the rear end of the rear-side part 20R of the rear side frame 20 is the border β.

The bracket 26 couples the setting plate 30, and the bracket 26 is formed by a high-tensile-strength rigid plate having an even larger plate thickness than the rear side frame main body 21 that has the largest plate thickness of the rear-side upper wall member 23, the front-side upper wall member 24, and the rear side frame main body 21. Thus, a difference in rigidity between the rear-side part of the rear side frame 20 and the bracket 26 occurs at the border β.

Further, the front end of the bracket 26, i.e., the border β is set at the same position as the bead b1 provided as a fragile portion. Thus, the border β at which a difference in rigidity between the rear side frame 20 and the bracket 26 occurs and at which the bead b1 is formed constitutes the rear-side breakage starting portion Sb.

Thus, the supporting rigidity of the rear bumper reinforcement 37 is secured by the bracket 26 to which the setting plate 30 is coupled. Moreover, while the rear bumper reinforcement 37 serves its original function of towing with a hook (not shown) attached thereto, the rear-side breakage starting portion Sb, where a difference in rigidity between the rear end of the rear side frame 20 and the front end of the bracket 26 occurs and where the bead b1 is located at the lower side of the rear end, acts as a breakage starter in a rear-end collision of the vehicle, thus facilitating breakage without hindering it.

In the rear side frame 20 thus configured, a section of a predetermined length in the vehicle front-rear direction that straddles the front-side breakage starting portion Sf formed at the position of the border portion α is defined as the front-side breaking frame section Ff, and a section of a predetermined length in the vehicle front-rear direction that straddles the rear-side breakage starting portion Sb formed at the position of the border β is defined as the rear-side breaking frame section Fb.

Furthermore, a section between the front-side breakage starting portion Sf and the rear-side breakage starting portion Sb is defined as the middle frame section Fm. This means that the middle frame section Fm includes a part of the front-side breaking frame section Ff on the vehicle rear side from the front-side breakage starting portion Sf, and a part of the rear-side breaking frame section Fb on the vehicle front side from the rear-side breakage starting portion Sb. The beads b2, b3 are formed at a lower part of the middle frame section Fm.

The axial proof stress of the rear-side breaking frame section Fb including the rear-side breakage starting portion Sb formed by the difference in rigidity between the rear end of the rear side frame 20 and the front end of the bracket 26 and the bead b1 at the lower part of the rear end is set to be lower than the axial proof stress of the front-side breaking frame section Ff including the front-side breakage starting portion Sf formed by the difference in rigidity between the front-side upper wall member 24 and the rear-side upper wall member 23. Since the middle frame section Fm is provided with the plurality of beads b2, b3 at a predetermined interval in the axial direction, the axial proof stress of the middle frame section Fm is set to be higher than the axial proof stress of the front-side breakage starting portion Sf and the rear-side breakage starting portion Sb.

FIG. 7A to FIG. 7D are views illustrating how the rear side frame 20 deforms in a rear-end collision of the vehicle. The alternate long and short dashed lines shown in FIG. 7A to FIG. 7D roughly represent an axis of the rear side frame 20 to clearly show how it deforms. Starting from a normal state (non-collision state) shown in FIG. 7A, when a rear-end collision load is input into the rear bumper reinforcement 37, this rear-end collision load can be temporarily received by the rear bumper beam 33.

Figure 7A:
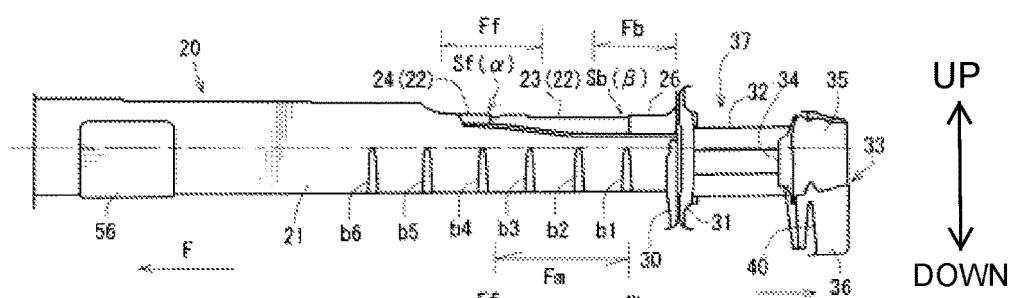
FIG. 7A to FIG. 7D are views illustrating how a rear side frame deforms in a rear-end collision.
Figure 7B:
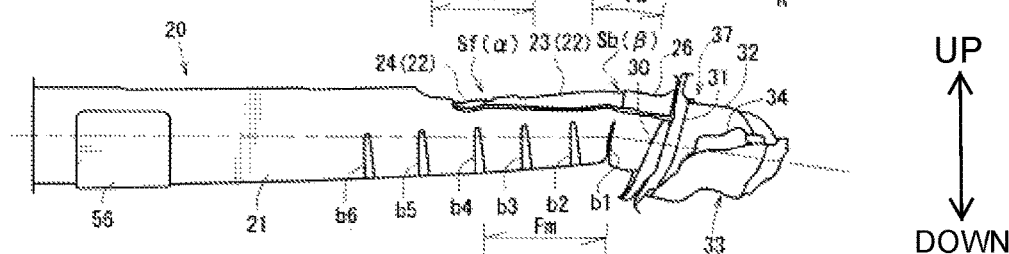

Thereafter, as shown in FIG. 7B, the crash can 32 is axially compressed to absorb the load. Moreover, the rear-side breakage starting portion Sb acts as a breakage starter and the rear-side breaking frame section Fb deforms so as to bend outward as shown in FIG. 7B to thereby absorb the load.

Figure 7C:
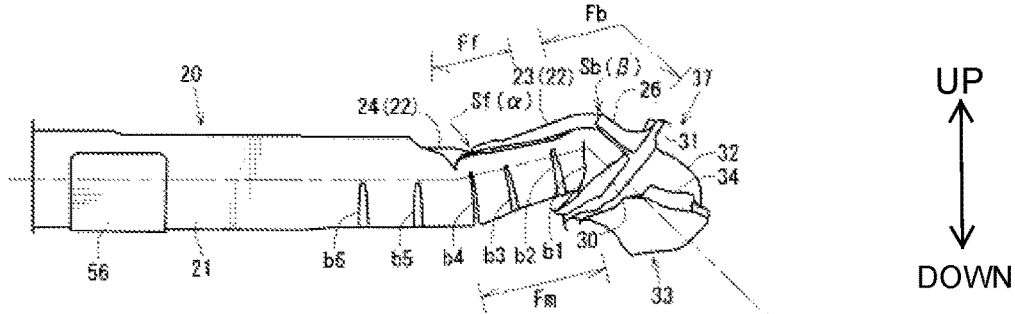
Figure 7D:
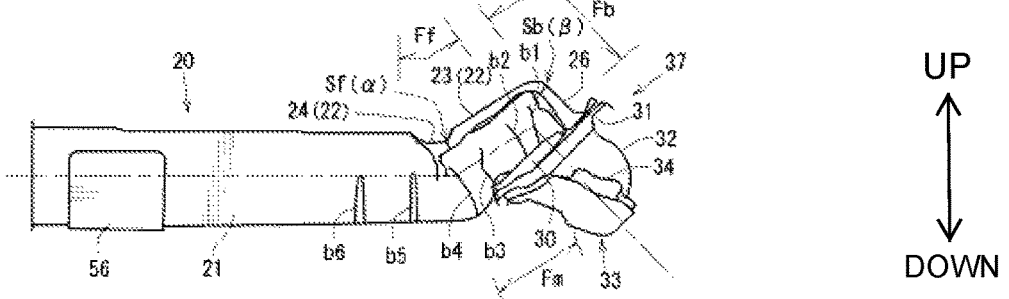

Next, as shown in FIG. 7C, the front-side breakage starting portion Sf acts as a breakage starter and the front-side breaking frame section Ff deforms so as to bend inward as shown in FIG. 7C to thereby absorb the load. Next, as shown in FIG. 7D, the beads b2, b3 in the middle frame section Fm and the bead b4 in the front-side breaking frame section Ff are crushed to absorb the load (energy), so that the front-side breaking frame section Ff deforms so as to bend inward to a greater degree. Thus, the rear-end collision load can be absorbed by a short frame region on the vehicle-body rear side. The arrows F, R, IN, OUT, and UP in the drawings indicate the vehicle front side, the vehicle rear side, the vehicle-width-direction inner side, the vehicle-width-direction outer side, and the vehicle upper side, respectively.

As has been described above, in the rear vehicle-body structure of a vehicle of the above embodiment, the rear side frame 20 extending toward the vehicle rear side is disposed on each side in the vehicle width direction. The breakage starting portions S of breakage in a substantially up-down direction are formed at predetermined intervals in the front-rear direction at the vehicle rear-side part of the rear side frame 20. In the rear side frame 20, the frame region including the rear-side breakage starting portion Sb that is located on the rear side among the breakage starting portions S disposed at predetermined intervals in the front-rear direction is defined as the rear-side breaking frame section Fb, and the frame region including the front-side breakage starting portion Sf which is disposed on the front side and at which the direction of breakage is opposite from the direction of breakage at the rear-side breakage starting portion Sb is defined as the front-side breaking frame section Ff. The frame region between the rear-side breakage starting portion Sb and the front-side breakage starting portion Sf is defined as the middle frame section Fm. The axial proof stress that is a proof stress in a direction along the axial direction in the rear-side breaking frame section Fb is set to be lower than the axial proof stress along the axial direction in the front-side breaking frame section Ff. The middle frame section Fm is provided with the plurality of beads b at predetermined intervals in the axial direction.

Thus, when a rear-end collision load is input, breakage toward the upper side at the rear-side breakage starting portion Sb located on the rear side in the rear side frame 20, breakage toward the lower side at the front-side breakage starting portion Sf located on the front side, and axial compression in the middle frame section Fm of the rear side frame 20 occur in this order.

If axial compression in the middle frame section Fm occurs before breakage at the rear-side breakage starting portion Sb and the front-side breakage starting portion Sf, the rear-end collision load can be absorbed but is absorbed by a larger frame region. Specifically, the rear-end collision load can be absorbed by a short frame region on the vehicle-body rear side when the middle frame section Fm undergoes axial compression after breakage in the rear-side breaking frame section Fb due to the rear-side breakage starting portion Sb and breakage in the front-side breaking frame section Ff due to the front-side breakage starting portion Sf occur.

The axial proof stress in the rear side frame 20 is set so as to decrease in order of the middle frame section Fm, the front-side breakage starting portion Sf, and the rear-side breakage starting portion Sb. Thus, when a rear-end collision load is input, breakage at the rear-side breakage starting portion Sb, breakage at the front-side breakage starting portion Sf, and axial compression in the middle frame section Fm occur reliably in this order, so that the rear-end collision load can be reliably absorbed by a short frame region on the vehicle-body rear side.

The rear-side breaking frame section Fb breaks so as to bend outward from the rear-side breakage starting portion Sb as a starting point, and the front-side breaking frame section Ff breaks so as to bend inward from the front-side breakage starting portion Sf as a starting point. Thus, effectiveness of load absorption (energy absorption) in a short frame region on the vehicle-body rear side can be enhanced.

The breakage starting portions S (Sf, Sb) are formed by fragile portions that are formed in at least one of the upper surface and the lower surface of the rear side frame 20. Thus, the rear side frame 20 breaks reliably in the up-down direction under a rear-end collision load at the breakage starting portions S that are formed by the fragile portions having lower rigidity than other portions of the rear side frame 20.

The bracket 26 to which the setting plate 30 is coupled is provided on the upper side of the rear end of the rear side frame 20, and the bracket 26 has higher rigidity than the rear side frame 20. The fragile portion at the rear-side breakage starting portion Sb is formed by the bead b1 that is formed so as to reduce the width of the cross-section of the rear side frame 20 on the lower surface side, and the border β on the upper surface side between the rear end portion of the rear side frame 20 and the front end of the bracket 26.

Thus, a difference in rigidity between the rear side frame 20 and the bracket 26 occurs on the upper surface side at the border β between the rear end portion of the rear side frame 20 and the front end of the bracket 26. Since the bead b1 is formed so as to reduce the width of the cross-section on the lower surface side, the rigidity at the cross-section is reduced. Thus, the fragile portion can be formed by the bead b1 formed on the lower surface side of the rear-side breakage starting portion Sb and the border β on the upper surface side between the rear side frame 20 and the bracket 26, and the rear-side breakage starting portion Sb at which the rear-side breaking frame section Fb breaks in the up-down direction can be reliably formed.

The direction of breakage of the rear-side breaking frame section Fb from the rear-side breakage starting portion Sb as a starting point can be easily set by adjusting the difference in rigidity between the rear side frame 20 and the bracket 26 and the width of the cross-section of the rear-side breaking frame section Fb that is reduced by the bead b1.

The rear side frame 20 includes the rear side frame main body 21 that has a U-shape in cross-section and the upper wall member 22 that closes the upper part of the rear side frame main body 21. The upper wall member 22 is formed by the rear-side upper wall member 23 that is disposed on the rear side in the rear side frame 20 and the front-side upper wall member 24 that is disposed on the front side. The rear-side upper wall member 23 is set to have a lower proof stress than the front-side upper wall member 24. The fragile portion at the front-side breakage starting portion Sf is formed by the border portion α between the rear-side upper wall member 23 and the front-side upper wall member 24. Thus, a difference in rigidity between the rear-side upper wall member 23 and the front-side upper wall member 24 occurs on the upper surface side at the border portion a between the rear-side upper wall member 23 and the front-side upper wall member 24. Therefore, the fragile portion can be formed by the border portion α between the rear-side upper wall member 23 and the front-side upper wall member 24 on the upper surface side of the front-side breakage starting portion Sf, and the front-side breakage starting portion Sf at which the front-side breaking frame section Ff breaks in the up-down direction can be reliably formed.

Since the proof stress of the rear-side upper wall member 23 constituting the middle frame section Fm is set to be lower than that of the member constituting part of the rear side frame 20 on the front side from the middle frame section Fm, i.e., that of the front-side upper wall member 24, it is possible to reliably absorb the load (energy) in a rear-end collision by causing the middle frame section Fm to undergo axial compression.

The beads b that are formed so as to reduce the width of the cross-section of the rear side frame 20 make it possible to reliably absorb the load (energy) in a rear-end collision by causing the middle frame section Fm to undergo axial compression. A desired proof stress of the middle frame section Fm can be set by adjusting the interval of the beads b in the axial direction or the width of the cross-section of the middle frame section Fm that is reduced by the beads b2, b3. Thus, the proof stress can be set such that axial compression in the middle frame section Fm occurs after breakage at the rear-side breakage starting portion Sb and breakage at the front-side breakage starting portion Sf.

The components of the present disclosure and those of the above embodiment correspond to each other as follows: the rear side frame of the present disclosure corresponds to the rear side frame 20; the breakage starting portion corresponds to the breakage starting portion S; the first breakage starting portion corresponds to the rear-side breakage starting portion Sb; the first frame section corresponds to the rear-side breaking frame section Fb; the second breakage starting portion corresponds to the front-side breakage starting portion Sf; the second frame section corresponds to the front-side breaking frame section Ff; the middle frame section corresponds to the middle frame section Fm; the low-axial-proof-stress portion corresponds to the bead b; the fragile portion corresponds to the bead b; the setting plate corresponds to the setting plate 30; the bracket corresponds to the bracket 26; the bead corresponds to the bead b1; the border between the rear end portion of the rear side frame and the front end of the bracket corresponds to the border β; the U-shaped member corresponds to the rear side frame main body 21; the upper wall member corresponds to the upper wall member 22; the rear-side upper wall member corresponds to the rear-side upper wall member 23; the front-side upper wall member corresponds to the front-side upper wall member 24; the border between the rear-side upper wall member and the front-side upper wall member corresponds to the border portion α; and the beads correspond to the beads b2, b3.

However, the components of the present disclosure are not limited to those of the above embodiment. The fragile portion may be formed by a welded area where the same members are joined and welded together, instead of the bead b to be described later that reduces the dimension in the width direction or the difference in rigidity that occurs at the border portions (α, β) where members different in rigidity from each other are connected to each other. The number of the beads b1 to b6 to be formed and the interval between the beads shown in the above embodiment are not limited to those of the structure of the embodiment shown in the drawings.

What is claimed is:

1. A rear vehicle-body structure of a vehicle in which a rear side frame extending toward a vehicle rear side is disposed on each side in a vehicle width direction, wherein:
   breakage starting portions for breaking the rear side frame in a substantially up-down direction are disposed at predetermined intervals in a front-rear direction at a vehicle rear-side part of the rear side frame;
   in the rear side frame, a frame region including a first breakage starting portion that is located on a rear side among the breakage starting portions disposed at predetermined intervals in the front-rear direction is defined as a first frame section, a frame region including a second breakage starting portion which is disposed on a front side and at which a direction of breakage is opposite from a direction of breakage at the first breakage starting portion is defined as a second frame section, and a frame region between the first breakage starting portion and the second breakage starting portion is defined as a middle frame section;
   an axial proof stress in a direction along an axial direction in the first frame section is set to be lower than an axial proof stress along an axial direction in the second frame section; and
   the middle frame section is provided with a plurality of low-axial-proof-stress portions at predetermined intervals in an axial direction.

2. The rear vehicle-body structure of a vehicle according to claim 1, wherein the axial proof stress in the rear side frame decreases in order of the low-axial-proof-stress portions, the second breakage starting portion, and the first breakage starting portion.

3. The rear vehicle-body structure of a vehicle according to claim 2, wherein the first frame section breaks so as to bend outward from the first breakage starting portion as a starting point, and the second frame section breaks so as to bend inward from the second breakage starting portion as a starting point.

4. The rear vehicle-body structure of a vehicle according to claim 3, wherein each of the breakage starting portions comprises a fragile portion in at least one of an upper surface and a lower surface of the rear side frame.

5. The rear vehicle-body structure of a vehicle according to claim 4, wherein:

a bracket to which a setting plate is coupled is provided on an upper side of a rear end of the rear side frame, and the bracket has higher rigidity than the rear side frame; and the fragile portion at the first breakage starting portion comprises a bead that reduces a width of a cross-section of the rear side frame on a lower surface side, and a border on an upper surface side between a rear end portion of the rear side frame and a front end of the bracket.

6. The rear vehicle-body structure of a vehicle according to claim 5, wherein:

the rear side frame includes a U-shaped member that has a U-shape in cross-section and an upper wall member that closes an upper part of the U-shaped member;

the upper wall member comprises a rear-side upper wall member that is disposed at a rear portion of the rear side frame and a front-side upper wall member that is disposed on a front side;

the rear-side upper wall member is set to have a lower proof stress than the front-side upper wall member; and the fragile portion at the second breakage starting portion comprises a border between the rear-side upper wall member and the front-side upper wall member.

7. The rear vehicle-body structure of a vehicle according to claim 6, wherein the low-axial-proof-stress portions each comprise a bead that reduces a width of a cross-section of the rear side frame.

8. The rear vehicle-body structure of a vehicle according to claim 1, wherein the first frame section breaks so as to bend outward from the first breakage starting portion as a starting point, and the second frame section breaks so as to bend inward from the second breakage starting portion as a starting point.

9. The rear vehicle-body structure of a vehicle according to claim 1, wherein each of the breakage starting portions comprises a fragile portion in at least one of an upper surface and a lower surface of the rear side frame.

10. The rear vehicle-body structure of a vehicle according to claim 1, wherein the low-axial-proof-stress portions each comprise a bead that reduces a width of a cross-section of the rear side frame.

11. The rear vehicle-body structure of a vehicle according to claim 2, wherein each of the breakage starting portions comprises a fragile portion in at least one of an upper surface and a lower surface of the rear side frame.

12. The rear vehicle-body structure of a vehicle according to claim 2, wherein the low-axial-proof-stress portions each comprise a bead that reduces a width of a cross-section of the rear side frame.

13. The rear vehicle-body structure of a vehicle according to claim 3, wherein the low-axial-proof-stress portions each comprise a bead that reduces a width of a cross-section of the rear side frame.

14. The rear vehicle-body structure of a vehicle according to claim 8, wherein each of the breakage starting portions comprises a fragile portion in at least one of an upper surface and a lower surface of the rear side frame.

15. The rear vehicle-body structure of a vehicle according to claim 8, wherein:

the rear side frame includes a U-shaped member that has a U-shape in cross-section and an upper wall member that closes an upper part of the U-shaped member;

the upper wall member comprises a rear-side upper wall member that is disposed at a rear portion of the rear side frame and a front-side upper wall member that is disposed on a front side;

the rear-side upper wall member is set to have a lower proof stress than the front-side upper wall member; and the fragile portion at the second breakage starting portion comprises a border between the rear-side upper wall member and the front-side upper wall member.

16. The rear vehicle-body structure of a vehicle according to claim 8, wherein the low-axial-proof-stress portions each comprise a bead that reduces a width of a cross-section of the rear side frame.

17. The rear vehicle-body structure of a vehicle according to claim 9, wherein:

a bracket to which a setting plate is coupled is provided on an upper side of a rear end of the rear side frame, and the bracket has higher rigidity than the rear side frame; and the fragile portion at the first breakage starting portion comprises a bead that reduces a width of a cross-section of the rear side frame on a lower surface side, and a border on an upper surface side between a rear end portion of the rear side frame and a front end of the bracket.

18. The rear vehicle-body structure of a vehicle according to claim 9, wherein:

the rear side frame includes a U-shaped member that has a U-shape in cross-section and an upper wall member that closes an upper part of the U-shaped member;

the upper wall member comprises a rear-side upper wall member that is disposed at a rear portion of the rear side frame and a front-side upper wall member that is disposed on a front side;

the rear-side upper wall member is set to have a lower proof stress than the front-side upper wall member; and the fragile portion at the second breakage starting portion comprises a border between the rear-side upper wall member and the front-side upper wall member.

19. The rear vehicle-body structure of a vehicle according to claim 9, wherein the low-axial-proof-stress portions each comprise a bead that reduces a width of a cross-section of the rear side frame.

20. The rear vehicle-body structure of a vehicle according to claim 16, wherein:

the rear side frame includes a U-shaped member that has a U-shape in cross-section and an upper wall member that closes an upper part of the U-shaped member;

the upper wall member comprises a rear-side upper wall member that is disposed at a rear portion of the rear side frame and a front-side upper wall member that is disposed on a front side;

the rear-side upper wall member is set to have a lower proof stress than the front-side upper wall member; and the fragile portion at the second breakage starting portion comprises a border between the rear-side upper wall member and the front-side upper wall member.

* * * * *